United States Patent [19]

Lambla et al.

[11] Patent Number: 5,118,778
[45] Date of Patent: Jun. 2, 1992

[54] PROCESS FOR THE PREPARATION OF SEMIORDERED POLYAMIDES-IMIDES

[75] Inventors: Morand Lambla, Hoenheim; Philippe Michaud; Jean Russo, both of Lyon, all of France

[73] Assignee: Rhone Poulenc Fibres, Lyon, France

[21] Appl. No.: 698,076

[22] Filed: May 10, 1991

[30] Foreign Application Priority Data

May 17, 1990 [FR] France .................. 90 06537

[51] Int. Cl.$^5$ .............................................. C08G 18/08
[52] U.S. Cl. ...................................... 528/52; 528/53; 528/73
[58] Field of Search ........................ 528/52, 53, 73

[56] References Cited

U.S. PATENT DOCUMENTS 4,600,729 7/1986 Zecker et al. ................. 528/73

Primary Examiner—Maurice J. Welsh
Attorney, Agent, or Firm—Stevens, Davis, Miller & Mosher

[57] ABSTRACT

The present invention relates to a process for obtaining semiordered polyamides-imides.

More particularly it consists in performing the polycondensation in two separate stages:
1) reaction between a part of an aromatic diisocyanate and all of the trimellitic anhydride in the presence of dimethylalkyleneurea of pH≦7 until the intermediate compound has dissolved,
2) successive addition of one or more aromatic diacids and of the remainder of the diisocyanate in the dimethylalkyleneurea of pH≦7 until the polyamide-imide obtained has dissolved completely.

The semiordered polymers thus obtained have a Tg lower than the random polymers, and this makes them easier to convert.

6 Claims, No Drawings

PROCESS FOR THE PREPARATION OF SEMIORDERED POLYAMIDES-IMIDES

The present invention relates to a process for the preparation of semiordered polyamides-imides.

It is already known according to FR 1,498,015 to prepare polyamides-imides by reaction in a single stage between at least one aromatic or aliphatic diisocyanate and at least one carbonyl compound capable of yielding, at the same time, an amide and an internal imide and containing, on the one hand, a carboxyl group and, on the other hand, a pair of carbonyl groups, each connected on one side to a different carbon atom of the same single trivalent radical and on the other to an oxygen atom, the two carbonyl groups being separated by at most three carbon atoms, the carboxyl group being separated from each of the carbonyl groups by at least two carbon atoms, in a molar ratio of 1:1 in a polar solvent of N,N-dimethylacetamide, N,N-dimethylformamide, N-methyl-2 pyrrolidone and dimethyl sulphoxide type.

It is also known according to EP A 194,058 to prepare polyamides and/or polyimides by polycondensation in a single stage at a temperature higher than 100° C. between a polycarboxylic acid or an acid anhydride and an aliphatic or aromatic diisocyanate in the presence of a catalyst of the alkali metal (hydrogen) carbonate, alkali metal hydroxide or alkali metal salt of polycarboxylic acid in an N,N-dimethylalkyleneurea solvent. According to this application the introduction of the monomers is performed in an arbitrary order.

All the known processes for obtaining polyamides-imides relate to the preparation of random polymers by processes comprising a single reaction stage.

It has now been found that it is possible to obtain semiordered polyamides-imides which have a first-order glass transition temperature (Tg) which is lower than that of the random polymers known hitherto. These polyamides-imides have the advantage of being capable of conversion at lower temperatures.

More particularly, the present invention relates to the preparation of polyamides-imides originating from an aromatic diisocyanate, trimellitic anhydride and terephthalic acid in dimethylalkyleneurea of pH $\leq 7$ by polycondensation, in the absence of catalyst, in two separate stages comprising:

1) the reaction between x moles of aromatic diisocyanate of formula $OCN-R_1-NCO$ and y moles of trimellitic anhydride at a temperature increasing from 0° to 200° C. in the presence of a quantity of dimethylalkyleneurea of pH $\leq 7$ which is sufficient to dimethylalkyleneurea of pH $\leq 7$ which is sufficient to dissolve the intermediate compound obtained until a practically complete removal of the carbon dioxide corresponding to the quantity theoretically formed until then, and then 2) the successive addition, at a temperature of 190° to 200° C., of:

z moles of aromatic diacid including t moles of diacid bearing $SO_3M$ groups conveyed by dimethylalkyleneurea of pH $\leq 7$, M denoting an alkali metal, and the remainder of aromatic diisocyanate (v moles) dropwise, and dimethylalkyleneurea in sufficient quantity for the complete dilution of the polyamide-imide, the proportion of diisocyanate being in slight excess relative to that of the acidic reactants, with $x \approx 0.5 \, y$ $y + z = 1$ $0 \leq t \leq z$ $0.5 \, y + z \leq v \leq 0.55 \, y + 1.05 \, z$ the values of x, y, z and t reduced to percentages are the following:

|  |  |
|---|---|
| | x = 35 to $\leq 50$ mol % |
| | y is between 70 and $<<100$ mol % |
| | z is between 0 and 30 mol % |
| | t is between 0 and 30 mol % |
| preferably: | x is between 35 and $\leq 42.5$ mol % |
| | y is between 70 and $\leq 85$ mol % |
| | z is between 15 and 30 mol % |
| | t is between 2 and 10 mol % |

The first stage of the reaction consists in reacting all of the trimellitic acid y moles with a deficiency of diisocyanate relative to the stoichiometry (x moles) in order to form predominantly blocks with predominantly imide structure according to the reaction:

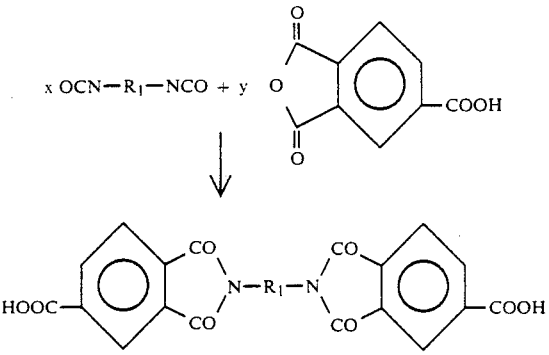

with $x \approx 0.5 \, y$

In the second stage the aromatic diacids are introduced in a proportion of z moles including t moles of diacid bearing $SO_3M$ groups such that:

$0 < z \leq 0.5 \, y$ $0 \leq t \leq z$

The remainder of diisocyanates v moles is then added such that:

$0.5 \, y + z \leq v \leq 0.55 \, y + 1.05 \, z$

The reactions are the following:

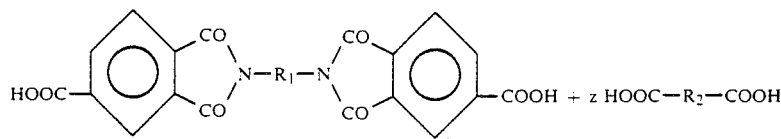

including t

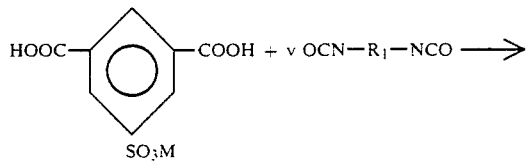

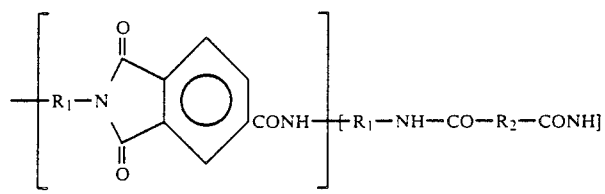

and where appropriate

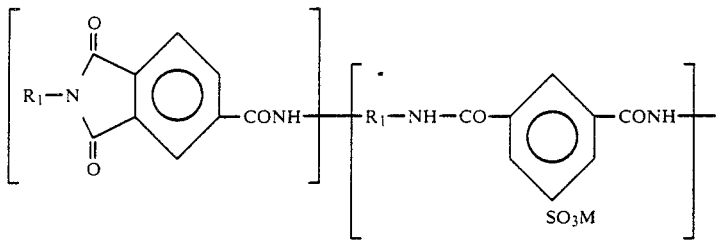

Stoichiometry means the reaction between an equal number of isocyanate reactive groups and anhydride and acidic reactive groups. According to the invention, 2,4- or 2,6- diisocyanatotoluene, 4,4'-diisocyanatodiphenylmethane, 4,4'-diisocyanatodiphenyl ether, 1,4-diisocyanatobenzene, 1,3-diisocyanatobenzene or a mixture thereof may be mentioned among the aromatic diisocyanates which can be employed.

The preferred diisocyanate is 4,4'-diisocyanatodiphenylmethane.

Terephthalic and isophthalic acids are generally employed among the aromatic diacids, although terephthalic acid is preferred.

Sodium or potassium 3,5-dicarboxybenzenesulphonates are preferably employed as a diacid bearing an $SO_3M$ group.

It is important in the conditions of the invention to employ dimethylethyleneurea (DMEU) or dimethylpropyleneurea (DMPU) of pH $\leq 7$, preferably between 5 and 7; otherwise the polycondensation is limited in molecular mass.

Furthermore, solvents other than the dimethylalkyleneureas have been employed, such as N-methylpyrrolidone: the block polycondensation is incomplete and the polyamide-imide obtained has a viscosity which is too low.

Anhydrous trimellitic anhydride of $\geq 98\%$ purity must be employed.

The semiordered polyamides-imides thus obtained have a number of imide-imide and amide-amide blocks which is higher than that of a polyamide-imide obtained in a single stage in the same solvent or in another solvent. Such polymers also have a glass transition temperature which is from 5° to 20° C. lower than that of the random polymers originating from the same constituents.

When fabricated by spinning, filming or moulding, they are thus easier to convert, in particular at lower temperatures, and this allows the degradation phenomena which may be produced to be limited.

In the examples which follow, the determination of the glass transition temperature Tg is carried out using a fibre pendulum in the following manner:

The polymer solution is employed to coat a hank of desized type E glass 5 cm in length. This impregnated hank is dried in a vacuum of $53.2 \times 10^{-2}$ Pa at 120° C. for 12 hours. This hank is then subjected to a torsional dynamic stress with the aid of a fibre pendulum. The change in the rigidity of the sample as a function of temperature is thus measured, and this makes it possible to determine the glass transition temperatures (Tg) of the material.

The characterisation of the imide and amide chain sequences is carried out using nuclear magnetic resonance ($^1$H NMR) by means of an apparatus known in the trade under the Bruker trademark. This analysis is performed as follows:

The polymer is isolated by precipitation in water, washing with boiling water and drying (12 H at 100° C. at $53.2 \times 10^{-2}$ Pa) and is then redissolved at a concentration of 5% (by weight) in deuterated DMSO under a septum heated to 130° C.

The conditions of $^1$H NMR analyses are:
pulse angle: 26°
acquisition time: 3.4 s per 16 k words
accumulation number: 512
waiting time: 2 s The chain sequences (imide-imide), (imide-amide), (amide-amide) are detected by virtue of the methylene resonances (e.g. MDI) at 4.2–3.7 ppm.

Unresolved bands made up of 3 types of II, IA and AA rays are observed.

The molar percentage of each type of $CH_2$ (% IA, % AA, % II) is obtained by deconvolution.

In the examples which follow the DMEU employed has a pH of 6 and the DMPU a pH of 7.

EXAMPLE 1

Apparatus: 1.5-1 glass reactor equipped with a stainless-steel anchor-type stirrer, speed of rotation 85 rev/min, a 250-ml dropping funnel intended for the addition of the diisocyanate solution in stage 2 and of the dilution solvent, a nitrogen inlet on a bubble counter, a thermometer probe and a reflux condenser with an outlet onto a bubble counter. The outlet of the condenser is connected to a column packed with 600 g of soda lime intended to trap the carbon dioxide released during the polycondensation reaction. A balance placed close to the apparatus enables the increase in weight of the soda lime-packed column to be recorded (direct access to the weight of $CO_2$ released).

Heating of the reactor is provided by a silicone oil bath controlled by a Logilap system assisted by a transmitter of a program of temperature rise and optionally of maintaining isothermal conditions at a given temperature (198° C. in most cases).

Reactants:

| Stage 1: | Trimellitic anhydride (TMAN) | 61.44 g (0.32 mol) |
| | 4,4-Diisocyanatodiphenylmethane (MDI) | 40 g (0.16 mol) |
| | Dimethylethyleneurea (DMEU) | 125 ml |
| Stage 2: | Terephthalic acid (TA) | 10.62 g (0.064 mol) |
| | Sodium 3,5-dicarboxybenzene-sulphonate (NaAiS) | 4.29 g (0.016 mol) |
| | DMEU | 100 ml |
| | MDI | 60 + 3 = 63 g (0.252 mol) |
| | DMEU | 100 ml |
| | DMEU rinsings | 37 ml |
| | DMEU dilution 27→ 21% | 149.4 g (d = 1.055) i.e. 142 ml |
| | DMEU used in the polycondensation | 381.6 g (d = 1.055) i.e. 362 ml |

Operating procedure:
Stage 1—TMAN, MDI and DMEU are charged, stirred, and the apparatus is purged by sweeping with nitrogen for 40 minutes. The temperature is raised to 198° C. in 1 h 10 min with release of $CO_2$: with 13.5 g trapped on soda lime, theory 14.08 g, i.e. 95.88%.
Stage 2—Addition of TA and of NaAiS (as powder), followed by 100 ml of DMEU in order to convey these reactants. The temperature changes from 198° to 151° C. Stabilisation of the bulk temperature at 198° C. and the addition of the MDI (63 g)/DMEU solution in 32 min are performed. The beginning of a rise in viscosity takes place 25 min after the beginning of the addition and the torque value reaches 100 mV 8 min after the end of the latter. The dilution DMEU is then added in 8 min, the bulk temperature decreases from 198° to 150° C., is allowed to return to room temperature and the product is stored.

Characterisation:

| Viscosity: Epprecht Rheomat 15 - vessel D + E - 25° C. | | | |
|---|---|---|---|
| speed | reading | f | η (poises) |
| 9 | 57.2 | 12.36 | 707 |

| Molecular masses: GPC - 60° C. - NMP Carrier with 5 × 10$^{-2}$ N as LiBr (mass given as polystyrene equivalent) | | | |
|---|---|---|---|
| Cutoff | Mn | Mw | Polydispersity |
| 1000 | 36560 | 76460 | 2.09 |

The PAI thus obtained has a number of blocks shown in the table below in comparison with a random PAI obtained from the same monomers in N-methylpyrrolidone according to the process described in FR 2,079,785.

| | Example 1 (block PAI) | Comparative (random PAI) |
|---|---|---|
| Imide-imide | 24% | 18% |
| Imide-amide | 32% | 44% |
| Amide-amide | 44% | 38% |
| Glass transition temperature - Tg | 270° C. | 285° C. |

EXAMPLE 2

The apparatus described in Example 1 is employed.
Objective: Production of a PAI with MDI without NaAiS (stoichiometry compensated with isophthalic acid) with sequential addition of the reactants.
Apparatus: the apparatus described in Example 1 is employed.
Reactants:

| Stage 1: | TMAN | 61.44 g (0.32 mol) |
| | MDI | 40 g (0.16 mol) |
| | DMEU | 125 ml |
| Stage 2: | TA | 10.62 g (0.064 mol) |
| | IA (isophthalic acid) | 2.66 g (0.016 mol) |
| | DMEU | 100 ml |
| | MDI | 60 + 3* = 63 g (0.252 mol) |
| | DMEU | 100 ml |
| | DMEU rinsings | 37 ml |
| | DMEU dilution 27→ 21% | 149.4 g (d = 1.055) i.e. 142 ml |
| | DMEU used in the polycondensation | 381.6 g (d = 1.055) i.e. 362 ml |

* = 3% excess/total MDI used in the polycondensation.

Operating procedure:
Stage 1—TMAN, MDI and DMEU are charged, stirred and purged by sweeping with nitrogen for 40 minutes. Beginning of the heating to 198° C. over 1 h 10 min with monitoring of the $CO_2$ release: 13.2 g trapped on soda lime, theory 14.08 g, i.e. 95.88%.
Stage 2—Powdered TA and IA are added, followed by 100 ml of DMEU in order to convey these 2 reactants. The bulk temperature is stabilised at 198° C. and the MDI (63 g)/DMEU solution is added in 32 min. Beginning of rise in viscosity 20 min after the beginning of the addition. The dilution DMEU is added 8 min after the end of the addition of the MDI/DMEU solution.

Duration of the addition of the dilution DMEU 8 min. (The bulk temperature decreases from 198° to 162° C.). Return to room temperature. Storage of the polymer.

Characterisation:

| Viscosity: Epprecht Rhéomat 15 - vessel D — E - 25° C. | | | |
|---|---|---|---|
| speed | reading | f | $\eta$ (poises) |
| 4 | 65 | 55.40 | 3601 |

EXAMPLE 3

Comparative (NMP)
Apparatus: same as that of Example 1.
Reactants:

| Stage 1: | TMAN | 61.44 g (0.32 mol) |
|---|---|---|
| | MDI | 40 g (0.16 mol) |
| | NMP (N-methylpyrrolidone) | 125 ml |
| Stage 2: | TA | 10.62 g (0.064 mol) |
| | NaAiS | 4.29 g (0.016 mol) |
| | NMP | 100 ml |
| | MDI | 60 g (0.24 mol) |
| | NMP | 100 ml |
| | NMP rinsings | 45.5 ml |
| | NMP dilution 27→ 21% | 149.4 g (d = 1.03) i.e. 145 ml |
| | NMP used in the polycondensation | 381.6 g (d = 1.03) i.e. 370.5 ml |

Operating procedure:

Stage 1—TMAN, MDI and NMP are charged, stirred and purged by sweeping with nitrogen for 45 min. The temperature is raised to 198° C. in 1 hour with monitoring of the release of $CO_2$: 13.2 g trapped on soda lime, theory 14.08 g, i.e. 93.75%.

Stage 2—Addition of TA and of NaAiS (as powder), by 100 ml NMP in order to convey these 2 reactants. The temperature changes from 198° to 153° C. The bulk temperature is stabilised at 197°–198° C. and the MDI/DMEU solution is added in 25 min: the dropping funnel is rinsed with 45.5 ml of NMP. No viscosity rise at the end of the addition. The reaction is allowed to take place for 10 min isothermally at 198° C., still no viscosity rise being observed ($CO_2$ trapped at the end of the addition: 90.9% of theory).

Additions of MDI are then performed (2 g + 1 g + 2 g in each case 10 ml of NMP) i.e. +5% /theoretical MDI. These additions have no effect on the viscosity.

Nevertheless, the dilution MNP is added, allowed to return to room temperature and the material stored. A highly coloured collodion is obtained which is of low viscosity ($\delta$10 poises) and therefore unusable.

EXAMPLE 4

The apparatus described in Example 1 is employed.
Reactants

| Stage 1: | TMAN | 61.44 g (0.32 mol) |
|---|---|---|
| | DIDE (4,4'-diisocyanatodiphenyl ether) | 40.32 g (0.16 mol) |
| | DMEU | 125 ml |
| Stage 2: | TA | 10.62 g (0.064 mol) |
| | NaAiS | 4.29 g (0.016 mol) |
| | DMEU | 100 ml |
| | DIDE | 60.48 g (0.24 mol) |
| | DMEU | 100 ml |

| -continued | |
|---|---|
| DMEU rinsings | 39 ml |
| DMEU used in the polycondensation | 364 ml (d = 1.055) i.e. 384 g |
| DMEU dilution 27→ 21% | 142 ml (d = 1.055) i.e. 150 g |

Operating procedure:

Stage 1—TMAN, DIDE and DMEU are charged with the vessel dismantled. The vessel is installed, stirred and purged with nitrogen for 45 min. The temperature is raised to 198° C. in 1 h 10 min with monitoring of the $CO_2$ release: 13.2 g trapped on soda lime, theory 14.08 g, i.e. 93.75%. TA and NaAiS (as powder) are added, followed by 100 ml of DMEU in order to convey these 2 reactants.

Stage 2—The bulk temperature is stabilised at 197°–198° C. and the DIDE/DMEU solution is added in 25 min and the dropping funnel is then rinsed with 39 ml of DMEU. A viscosity rise is observed, torque value 72 mV. The reaction is allowed to proceed for another 10 min, the dilution DMEU being added in 10 min. After returning to room temperature the product obtained is stored.

$CO_2$ balance of the 2 stages: 33.0 g (theory 35.2 g) i.e. 93.75%. It is unnecessary to perform DIDE additions to obtain the viscosity rise.

Characterisation:

| Viscosity: Epprecht Rhéomat 15 - vessel D — E - 25° C. | | | |
|---|---|---|---|
| speed | reading | f | $\eta$ (poises) |
| 9 | 70 | 12.36 | 865 |

| Molecular masses: GPC - 60° C. - NMP carrier with $5 \times 10^{-2}$ N as LiBr (Mass given as polystyrene equivalent) | | | | |
|---|---|---|---|---|
| Cutoff | Mn | Mw | Mz | Polydispersity |
| 1000 | 30080 | 70560 | 119650 | 2.35 |
| Glass transition temperature Tg | | | | 272° C. |
| control random PAI | | | | 280° C. |

EXAMPLE 5

Apparatus: the same as that described in Example 1.
Reactants:

| Stage 1: | TMAN | 76.8 g (0.4 mol) |
|---|---|---|
| | TDI (2,4-diisocyanatotoluene) | 34.8 g (0.2 mol) |
| | DMEU | 125 ml (d = 1.055) i.e. 132 g |
| Stage 2: | TA | 13.28 g (0.08 mol) |
| | NaAiS | 5.36 g (0.02 mol) |
| | DMEU | 130 ml (d = 1.055) i.e. 137 g |
| | 2,4-TDI | 52.2 g (0.3 mol) |
| | DMEU rinsings | 80 ml + 20 ml (d = 1.055) i.e. 105.5 g |

Operating procedure:

Stage 1—TMAN, DMEU and 2,4-TDI are charged with the vessel dismantled. The vessel is installed and purged with a stream of nitrogen with stirring for 20 min. The temperature is raised until the $CO_2$ release is close to theory (0.4 mol i.e. 17.6 g). This value is reached (17 g i.e. 96.6% of theory) at 197° C. i.e. 1 h 20 min after the beginning of the heating.

Stage 2—TA, NaAiS (as powder) are added, and 130 ml of DMEU in order to convey these 2 powders into the reaction mass. At a bulk temperature of 192° C. the solution of TDI in DMEU is added dropwise in 50 min (no exotherm, isothermal at 197° C.) and then rinsing is carried out with 2×10 ml of DMEU. The isotherm at 198° C. is continued for 40 min. No viscosity rise is observed. Additions of 1 ml of TDI (3×1 ml) are then performed. After each addition a viscosity rise is observed. Another 1 ml of TDI is introduced, the isotherm at 198° C. is maintained for 38 min, the dilution DMEU is added in 10 min, and after returning to 50°-60° C. the product is stored.
Characterisation:

| Molecular masses: GPC - 80° C. - NMP carrier with $5 \times 10^{-2}$ N as LiBr (Mass given as polystyrene equivalent) | | | | |
|---|---|---|---|---|
| Cutoff | Mn | Mw | Mz | Polydispersity |
| 1500 | 35920 | 75270 | 130830 | 2.10 |

| Viscosity: Epprecht Rheomat 15 - vessel D + E - 25° C. | | | |
|---|---|---|---|
| speed | reading | f | $\eta$ (poises) |
| 9 | 78 | 12.36 | 964 |

EXAMPLE 6

The apparatus described in Example 1 is employed.
Objective: Production of a PAI with MDI without NaAiS (stoichiometry compensated with isophthalic acid) with sequential addition of the reactants into the DMPU.

Apparatus: the apparatus described in Example 1 is employed.
Reactants:

| Stage 1: | TMAN | 61.44 g (0.32 mol) |
|---|---|---|
| | MDI | 40 g (0.16 mol) |
| | DMPU | 125 ml |
| Stage 2: | TA | 10.62 g (0.064 mol) |
| | IA (isophthalic acid) | 2.66 g (0.016 mol) |
| | DMPU | 100 ml |
| | MDI | 60 + 3* = 63 g (0.252 mol) |
| | DMPU | 100 ml |
| | DMPU rinsings | 37 ml |
| | DMPU dilution 27→ 21% | 149.4 g (d = 1.055) i.e. 142 ml |
| | DMPU used in the polycondensation | 385 g i.e. approximately 362 ml |

*3% excess/total MDI used in the polycondensation.

Operating procedure:
Stage 1—TMAN, MDI and DMPU are charged, stirred and purged by sweeping with nitrogen for 20 minutes. Beginning of heating to 198° C. in 1 h with monitoring of $CO_2$ release: 13.2 g trapped on soda lime, theory 14.08 g, i.e. 93.75%.
Stage 2—Powdered TA and AI are added, followed by 100 ml of DMPU in order to convey these 2 reactants. The bulk temperature is stabilised at 198° C. and the clear MDI (63 g)/DMPU solution is added in 42 min, rinsing with DMPU. The addition is stopped when 15 ml of solution remains to be run in (175 ml initially), since the viscosity changes very rapidly (torque value 324 md). Deficiency of MDI relative to the 63 g dissolved:

63×15=5.4 g i.e. (,4-3.0=2.4 g (−2.4% relative to stoichiometry). $CO_2$ balance at the end of the stage: 95.2%.
Duration of the addition of the dilution dimethylpropyleneurea 11 min. (The bulk temperature decreases from 198° to 145° C.). Return to room temperature. Storage of the polymer.
Characterisation:

| Viscosity: Epprecht Rheomat 15 - vessel D + E - 25° C. | | | |
|---|---|---|---|
| speed | reading | f | $\eta$ (poises) |
| 4 | 56.4 | 55.40 | 3125 |

| Molecular masses: GPC - 60° C. - NMP carrier with $5 \times 10^{-2}$ N as LiBr (Mass given as polystyrene equivalent) | | | | |
|---|---|---|---|---|
| Cutoff | Mn | Mw | Mz | Polydispersity |
| 1000 | 36510 | 80390 | 135260 | 2.20 |

| Glass transition temperature Tg | 272° C. |
|---|---|
| control random PAI | 280° C. |

We claim:
1. Process for obtaining semiordered polyamidesimides capable of being formed and originating from an aromatic diisocyanate, trimellitic anhydride and at least one aromatic diacid, in stoichiometric proportions or with a slight excess of diisocyanate, in dimethylalkyleneurea pH $\leq 7$, by polycondensation in the absence of catalyst in two separate stages comprising:
 1) the reaction between x moles of aromatic diisocyanate of formula $OCN-R_1-NCO$ and y moles of trimellitic anhydride at a temperature increasing from 0° to 200° C. in the presence of a quantity of dimethylalkyleneurea of pH $\leq 7$ which is sufficient to dissolve the intermediate compound obtained until practically complete removal of the carbon dioxide corresponding to the quantity theoretically formed until then, and then,
 2) the successive addition, at a temperature of 190° to 200° C., of:
 z mole(s) of aromatic diacid including
 t moles of an aromatic diacid bearing a $SO_3M$ group conveyed by dimethylalkyleneurea of pH $\leq 7$, and
 v moles of aromatic diisocyanate corresponding to the complement of diisocyanate, introduced in the first stage, dropwise, and dimethylalkyleneurea in sufficient quantity for the complete dilution of the polyamideimide (PAI) with:

$x \leq 0.5 y$ $y + z = 1$ $0 \leq t \leq z$ $0.5 y + z \leq v \leq 0.55 y + 1.05 z$ 2. Process according to claim 1, characterised in that the various constituents are present in the following proportions, reduced to a percentage:
 x between 35 and $\leq 50$ mol %
 y between 70 and $< 100$ mol %
 z between 0 and 30 mol %
 t between 0 and 30 mol %
3. Process according to claim 1, characterised in that the various constituents are present in the following proportions, reduced to a percentage:

x between 35 and 42.5 mol %
y between 70 and ≦85 mol %
z between 15 and 30 mol %
t between 2 and 10 mol %

4. Process according to claim 1, characterised in that the diisocyanate is 4,4'-diphenylmethane diisocyanate.

5. Process according to claim 1, characterised in that the aromatic diacid is terephthalic acid.

6. Process according to claim 1, characterised in that the acidic compound bearing an SO$_3$M group is sodium 3,5-dicarboxybenzenesulphonate.

* * * * *